United States Patent [19]

Tanaka

[11] Patent Number: 5,642,803
[45] Date of Patent: Jul. 1, 1997

[54] ARTICLE LOADING APPARATUS AND METHOD THEREFOR

[75] Inventor: Nobuhiro Tanaka, Saitama, Japan

[73] Assignee: Kao Corporation, Tokyo, Japan

[21] Appl. No.: 720,898

[22] Filed: Oct. 7, 1996

Related U.S. Application Data

[63] Continuation of Ser. No. 207,742, Mar. 9, 1994, abandoned.

[30] Foreign Application Priority Data

Mar. 19, 1993 [JP] Japan ................................. 5-083792

[51] Int. Cl.$^6$ ................................................. B65G 47/04
[52] U.S. Cl. ........................ 198/535; 198/536; 198/594; 414/398; 414/794.5; 414/794.6; 414/794.8
[58] Field of Search ........................ 198/535, 536, 198/593, 594, 861.5; 414/398, 794.5, 794.6, 794.8, 799

[56] References Cited

U.S. PATENT DOCUMENTS

| | | |
|---|---|---|
| 3,140,770 | 7/1964 | Herring et al. . |
| 3,533,498 | 10/1970 | Weir . |
| 3,651,963 | 3/1972 | McWilliams ........................ 414/794.6 |
| 3,819,068 | 6/1974 | Weir ................................ 198/535 |
| 4,093,084 | 6/1978 | Ringer ................................ 414/398 |
| 5,009,560 | 4/1991 | Ruder et al. . |
| 5,325,953 | 7/1994 | Doster et al. ......................... 198/535 |

FOREIGN PATENT DOCUMENTS

| | | |
|---|---|---|
| 0254261 | 1/1988 | European Pat. Off. . |
| 1246342 | 10/1960 | France . |
| 2500786 | 7/1975 | Germany . |
| 2633170 | 2/1977 | Germany . |
| 48-110885 | 12/1973 | Japan . |
| WO88/02346 | 4/1988 | WIPO . |

*Primary Examiner*—Joseph E. Valenza
*Attorney, Agent, or Firm*—Oblon, Spivak, McClelland, Maier & Neustadt, P.C.

[57] ABSTRACT

Article loading apparatus and method for loading articles such as fiberboard containers onto a loading carrier base such as pallet, with which it is possible to reduce required labor and to enhance working efficiency. An article loading conveyer which makes a conveying path on which an article is conveyed swingable and extendable is provided. An article transfer carrier having an article sliding surface is connected to a distal end of the loading conveyor. The article sliding surface is kept at a substantially constant posture with respect to a horizontal plane by the provision of a posture control device, regardless of the incline of the loading conveyor.

14 Claims, 7 Drawing Sheets

ARTICLE LOADING APPARATUS AND METHOD THEREFOR

This application is a Continuation of application Ser. No. 08/207,742, filed on Mar. 9, 1994, now abandoned.

BACKGROUND OF THE INVENTION

1. Field of the Invention

The present invention relates to an apparatus and method for loading articles such as fiberboard containers onto a loading carrier base such as a pallet.

2. Discussion of the Related Art

It is known in the art that a telescopic conveyor is used in order to load articles such as fiberboard containers onto a loading carrier base such as a pallet, a container carrier and a motor truck loading space, as disclosed in Japanese Utility Model Publication No. Sho. 48-110885. The telescopic conveyor is provided with a conveyance path which enables the conveyance of the articles thereon toward a side where the articles are to be loaded and which is designed to be swingable and telescopic (extendable and contractible). With such a conveyor, a worker can receive, at the distal end of the conveyor, each of the articles which are conveyed toward the loading side, and load the received article onto a required loading position of the side.

The conventional art as mentioned above, however, has the following deficiencies:

(1) Since the telescopic conveyor is swung depending on the level or height of the loading position, the conveyance path of the conveyor is inclined upward or downward in use. Consequently, the worker must stop and receive, at the distal end of the conveyor, the article to which the conveying force due to the incline of the conveyor is applied. Thereafter, the worker must orient or direct the article suitably for loading and further transfer the article to the loading position by himself (without any external assistance). Thus, the worker must repeat heavy physical labor and be forced to perform hard work.

(2) If an article conveying-in conveyor is connected to the upstream end of the telescopic conveyor so as to successively convey the articles thereto without any temporary stoppage or storage of the articles, the worker will never view all the articles to be loaded entirely before starting the loading operation. Thus, it is impossible for the worker to perform the loading operation after the determination is preliminarily made as to how the loading process is carried out (the articles should be loaded vertically or horizontally, or the like) in order to form a completed posture of the articles, which is hardly collapsed onto the load carrier base. Therefore, the working efficiency cannot be sufficiently improved.

(3) In the case where a single article conveying-in conveyor is connected to the upstream end of the telescopic conveyor, the downstream end of the telescopic conveyor is generally set at a fixed position in the width direction of the loading carrier base. That is to say, the downstream end of the telescopic conveyor can be disposed at a location just confronting one of a plurality of loading portions of the loading carrier base, which portions are imaginally defined on the loading surface in the width direction thereof, but can not be disposed at the other locations confronting the other loading portions. Consequently, the worker must be required to transfer the articles along a large distance by himself, and the physical labor mentioned in deficiency (1) becomes excessive. Thus, working efficiency is adversely effected and the worker must perform hard work.

(4) The telescopic conveyor conveys out the articles therefrom at fixed intervals or timings. Consequently, the worker must repeat the heavy physical labor at a fixed rhythm regardless of his skill, physical fatigue, physical strength or the like, so that the worker must perform hard work with poor working efficiency.

(5) The worker who receives an article at the downstream end of the telescopic conveyor, must transfer the article to a desired loading position while holding the article by himself and avoiding the obstructive articles which have already been loaded. The required labor is increased and the working efficiency is deteriorated.

SUMMARY OF THE INVENTION

It in an object of the present invention to solve the problems found in the prior art, and in particular, to reduce the required labor of the worker by improving working efficiency when loading articles onto a loading carrier base such as a pallet.

The invention relates to a novel article loading apparatus defining a conveying path by which an article is capable of being conveyed toward a side where the article is to be loaded, the apparatus having a loading conveyor which makes the conveying path swingable and extendable, wherein the device further comprises an article transfer carrier having an article sliding surface, which is connected to a distal end of the loading conveyor, and a posture control device for keeping the article sliding surface of the carrier at a substantially constant posture with respect to a horizontal plane.

In a feature of the article loading apparatus of the present invention, the loading conveyor is connectable to a discharge end of an article storage conveyor whereby an article temporarily stored in the article storage conveyor is conveyed therefrom into the loading conveyor.

In a further feature of the article loading apparatus of the present invention, a plurality of the article storage conveyors are disposed in parallel relation to each other, and the loading conveyor is provided with a running device to enable the loading conveyor to be moved along a front surface defined by each of the article storage conveyors and to be positioned at the discharge end of each of the article storage conveyors.

The article loading apparatus of the present invention is further characterized in that the loading conveyor is provided with a discharge instruction device instructing the discharge of the article for the article storage conveyor, and the article storage conveyor is provided with an article discharge device for discharging an article in accordance with the instruction device.

The present invention also provides for an article loading apparatus in which a slide device is provided to enable the article transfer carrier to move in a direction perpendicular to a conveying direction of the loading conveyor.

The present invention further relates to an article loading process for loading an article onto a loading position defined on a loading carrier, using an article loading apparatus as described above. The process comprises the steps of: swinging and extending the article loading conveyor so as to position a distal end of the article transfer carrier adjacent the loading position defined on the loading carrier while keeping the article sliding surface of the transfer carrier at a substantially constant posture with respect to a horizontal plane by the posture control device; and sliding on the sliding surface an article which is conveyed by the loading conveyor and loading the article onto the loading position defined on the loading carrier using the inertia of the conveying force which is applied to the article by the loading conveyor.

The present invention further relates to an article loading process for loading articles in a plurality of loading sections defined on a loading carrier, using the article loading apparatus described above, the process comprising the steps of: sorting the articles to respective article storage conveyors corresponding to the loading sections; positioning the loading conveyor at a discharge end of one article storage conveyor corresponding to a desired one of the loading sections defined on the loading carrier; instructing from the discharge instruction device of the loading conveyor to the article storage conveyor to discharge the article therefrom, and conveying the discharged article from the article storage conveyor into the loading conveyor; swinging and extending the article loading conveyor so as to position a distal end of the article transfer carrier adjacent the loading position defined on the loading carrier while keeping the article sliding surface of the transfer carrier at a substantially constant posture with respect to the horizontal plane by the posture control device; and sliding on the sliding surface an article which is conveyed by the loading conveyor and loading the article onto the loading position defined on the loading carrier using the inertia of the conveying force which is applied to the article by the loading conveyor.

The above-described invention therefore produces the following functions (1)–(5):

(1) By swinging and extending the conveying path of the loading conveyor, the distal end of the article transfer carrier can be positioned in the vicinity of the article loading position. Further, the article sliding surface of the article transfer carrier can be maintained at a substantially constant posture with respect to the horizontal plane, that is, it can be maintained horizontally or at a slightly downward incline (the incline angle: 0–2°) with respect to the horizontal plane, regardless of the swing angle (incline angle) of the loading conveyor. Therefore, the article discharged from the loading conveyor can be transferred to the loading position easily in such a manner that the article is slid on the sliding surface of the transfer carrier while being directed by the operator's hand help without suppressing the influence of the inertia force applied by the conveyor. During the process of the transfer, the operator can also easily rotate the article on the sliding surface of the article transfer carrier so as to orient the posture of the article suitably for loading. That is to say, it is possible to reduce the physical labor of the operator.

(2) It is possible to provide, upstream of the loading conveyor, the article storage conveyor which temporarily stores articles. Consequently, the operator can view all of the articles to be loaded before the start of the loading, so that the operator can start his loading work after the loading processes to be performed, whether the articles are loaded horizontally or vertically, or the like can be preliminary determined in order to form an entire or resultant shape which can hardly be collapsed on the loading carrier when the loading operation is completed. That is to say, the working efficiency can be improved.

(3) A plurality of article storage conveyors can be connected to the upstream of the loading conveyor, and the loading conveyor can be positioned at the discharge end of each of the article storage conveyors. Therefore, the loading conveyor can be selectively located in the vicinity of any one of a plurality of loading sections imaginarily defined by dividing the loading surface of the loading base or carrier in the width direction thereof. Further, the article discharged from the article storage conveyor can be transferred to the loading section to which the loading conveyor is adjacently located. Thus, the length which the operator must transfer the article can be made small to thereby reduce the physical labor and to improve the working efficiency.

(4) The article discharge timing from the article storage conveyor can be controlled by the instruction of the article discharge instruction device provided in the loading conveyor. Therefore, the timing can be selected suitable for the operator's skill, physical fatigue and physical strength, to thereby reduce the physical labor and improve the working efficiency.

(5) The article transfer carrier can be moved in a direction perpendicular to a conveying direction of the loading conveyor. Therefore, the operator, when performing the article transfer process from the article transfer carrier to the article loading position, can avoid other articles which have already been loaded and transferred to the loaded position, to thereby reduce the physical labor and improve the working efficiency.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIGS. 4A, 4B and 4C are schematic diagrams, each showing a major construction of a loading device, wherein

FIGS. 5A and 5B are schematic diagrams, each showing a construction by which an article storage conveyor is connected to a loading conveyor, wherein

FIGS. 6A, 6B and 6C are schematic diagrams, each showing the entire construction of the loading conveyor, wherein

FIGS. 7A, 7B, 7C and 7D are schematic diagrams, each showing a distal end of the loading conveyor, wherein FIGS. 8A, 8B and 8C are schematic diagrams showing a respective working status for loading, wherein

DETAILED DESCRIPTION OF THE PREFERRED EMBODIMENTS

Figure 1:
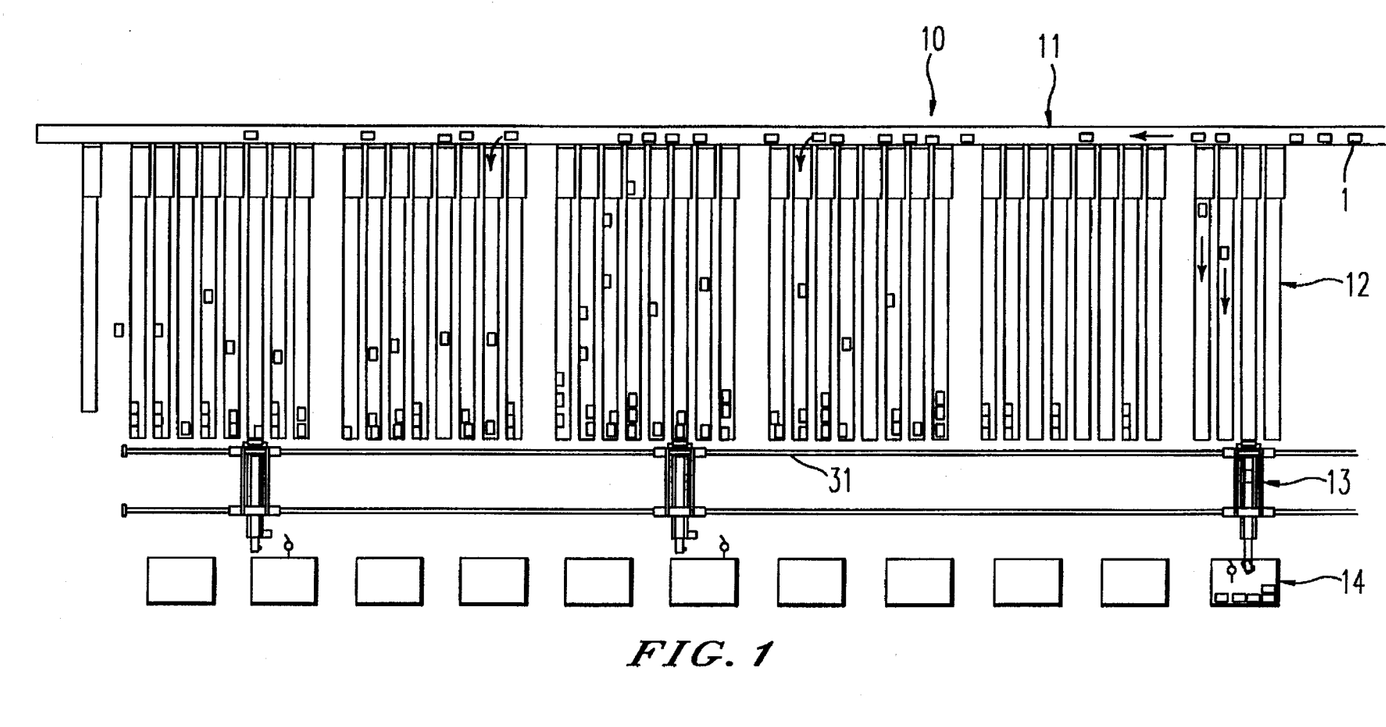
FIG. 1 shows an entire disposition of one example of a sorting apparatus according to the present invention.
Figure 2:
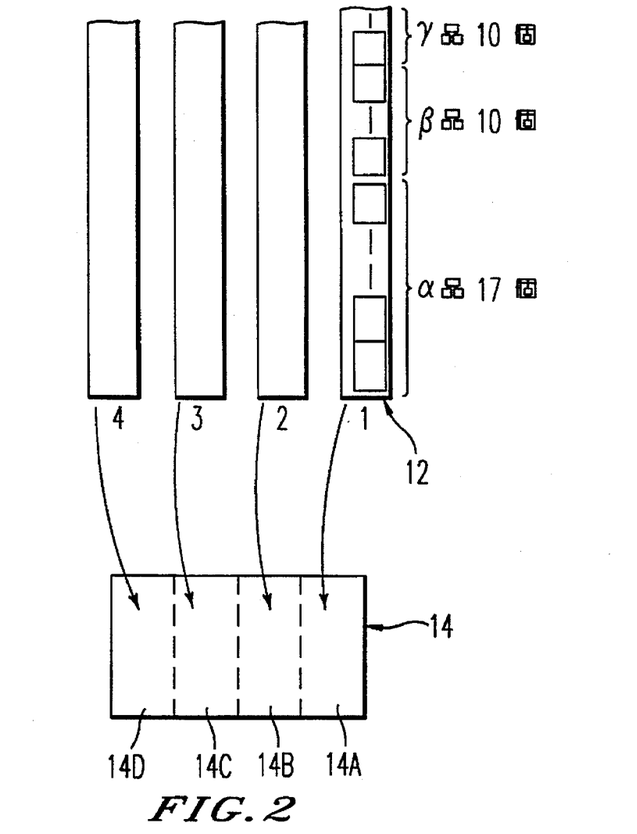
FIG. 2 is a schematic diagram showing the positional relationship between an article alignment line and a loading section.
Figure 3:
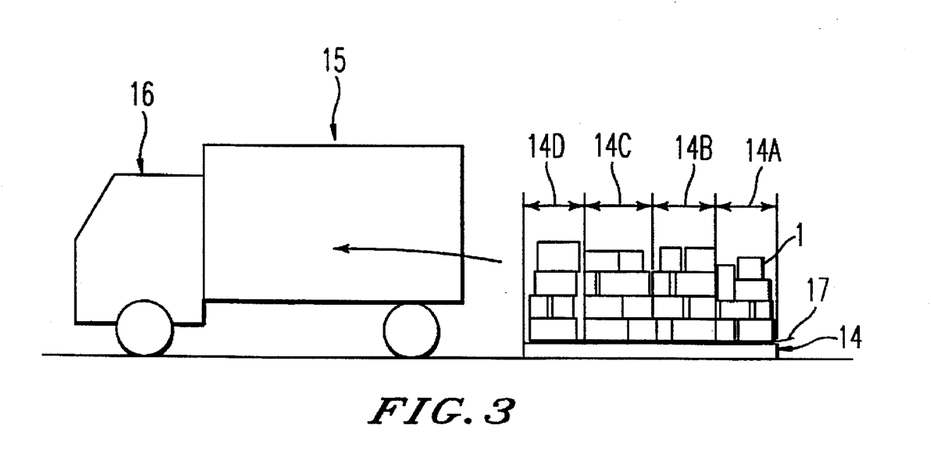
FIG. 3 is a schematic diagram showing a process for loading a loading carrier base onto a motor truck carrier space.
Figure 4A:
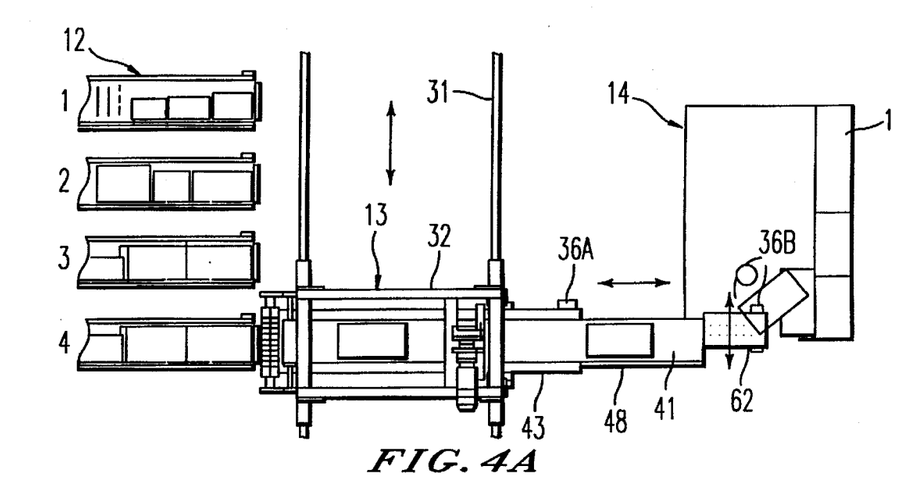
FIG. 4A is a plane view.
Figure 4B:
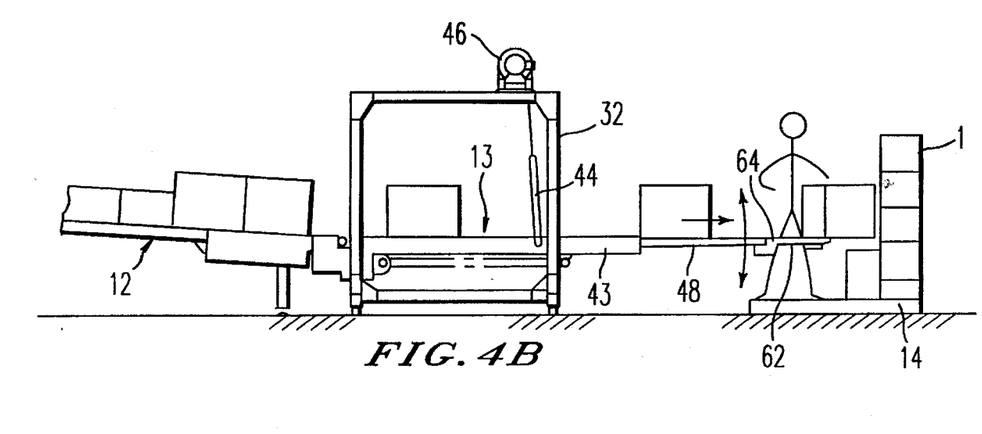
FIG. 4B is a side view.
Figure 4C:
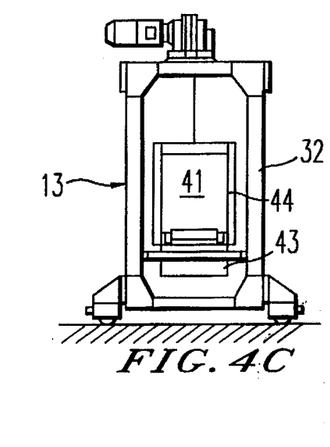
FIG. 4C is a front view.
Figures 5A, 5B:
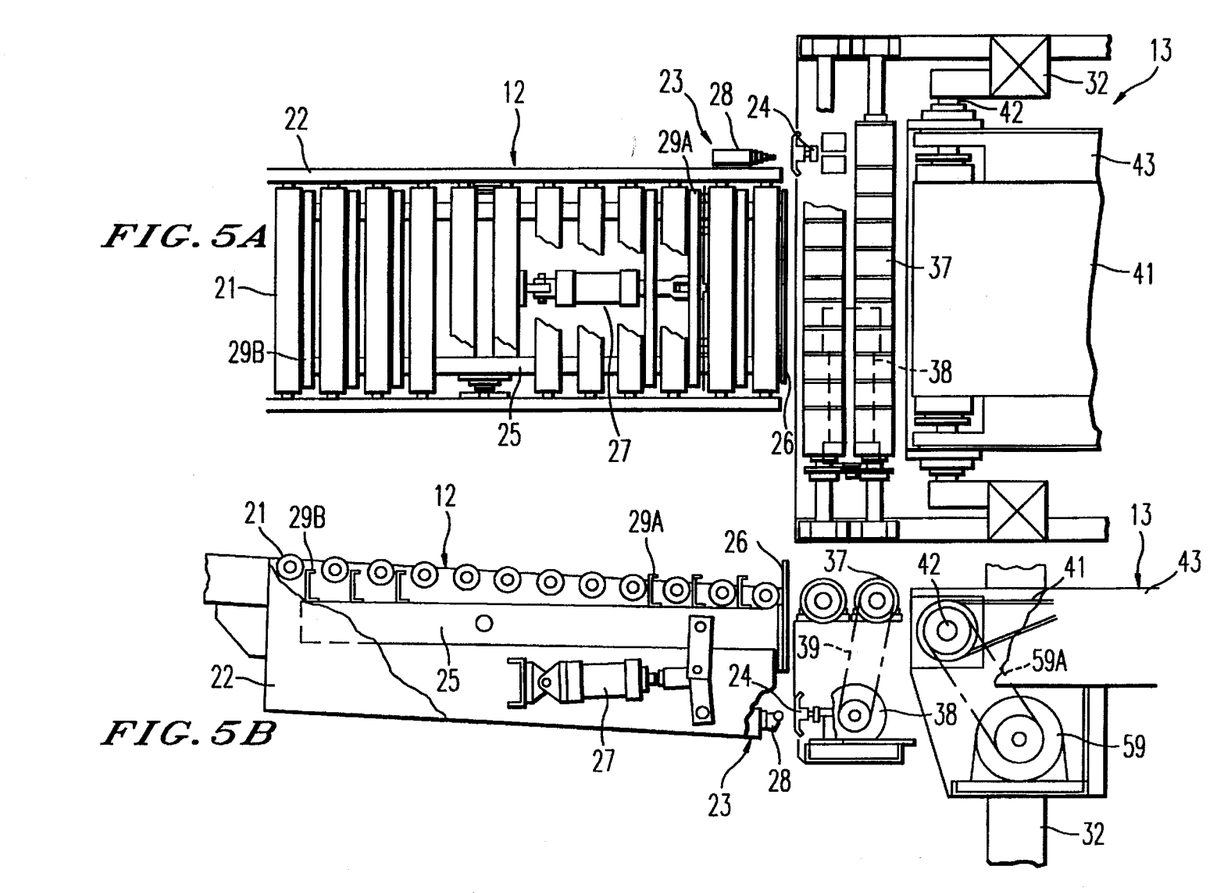
FIG. 5A is a plane view and FIG. 5B is a side view.
Figures 6A, 6B, 6C:
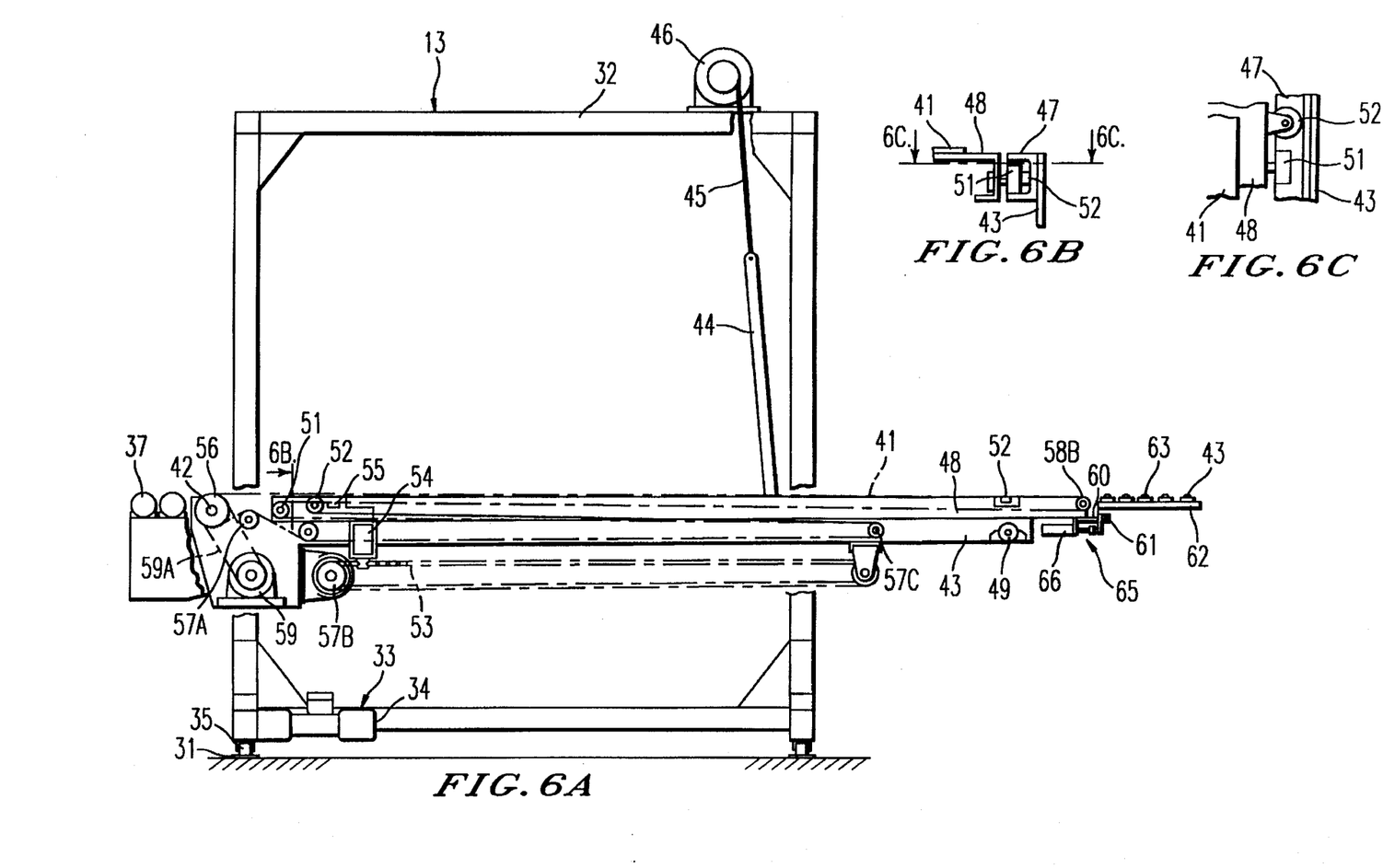
FIG. 6A is a side view.
FIG. 6B is a view taken and viewed in the direction of arrow 6B of FIG. 6A.
FIG. 6C is a view taken and viewed along arrow lines 6C—6C of FIG. 6B.
Figure 7A:
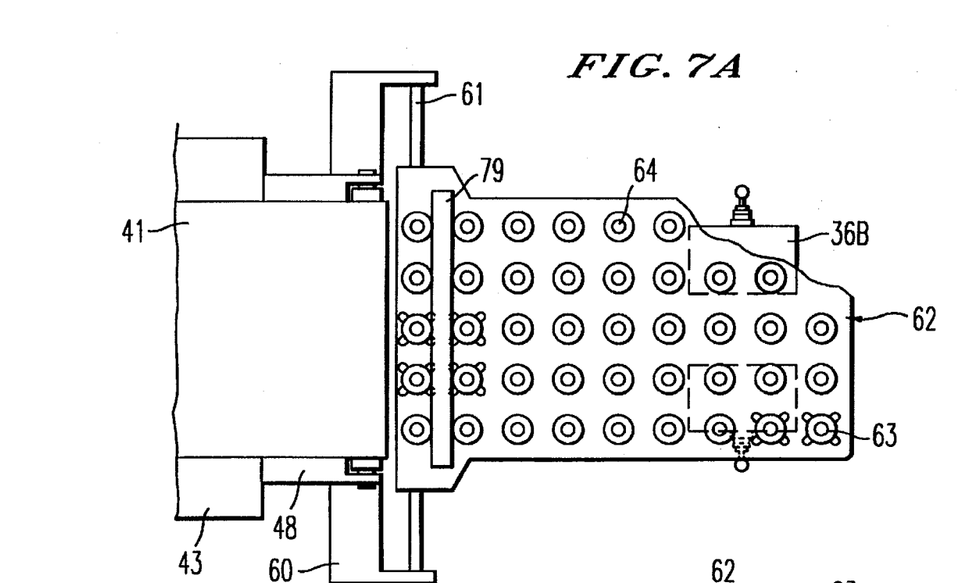
FIG. 7A is a plane view.
Figure 7B:
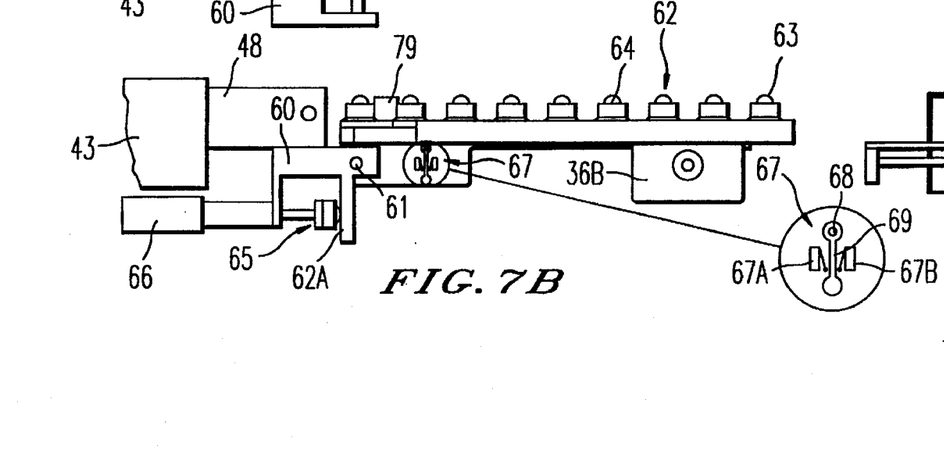
FIG. 7b is a side view.
Figure 7C:
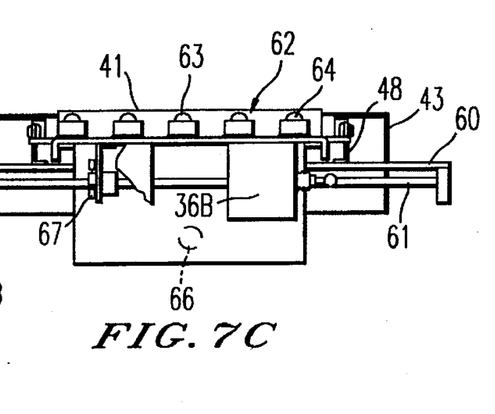
FIG. 7C is a front view.
Figure 7D:
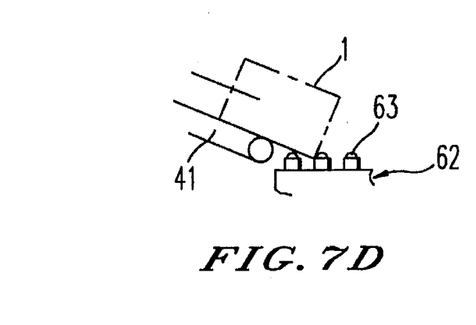
FIG. 7D is a schematic diagram showing a disadvantage occurring when a gap plate is not provided for an article transfer carrier.
Figure 8A:
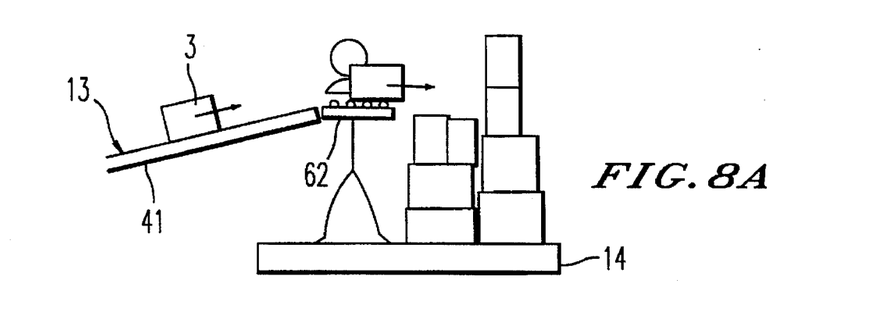
FIG. 8A shows a basic mode.
Figure 8B:
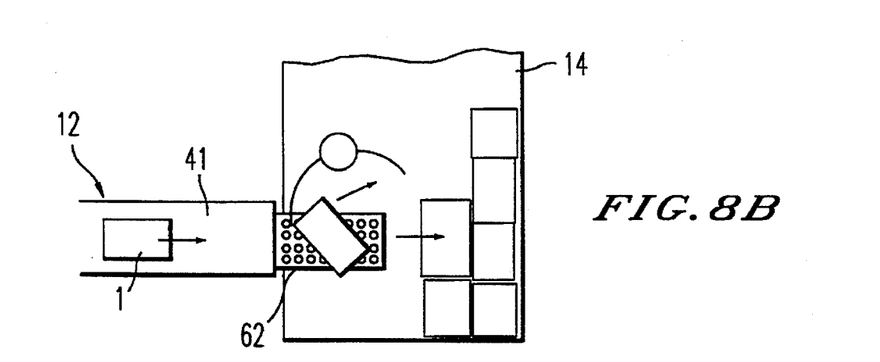
FIG. 8B is another mode wherein an article is loaded with its direction changed.
Figure 8C:
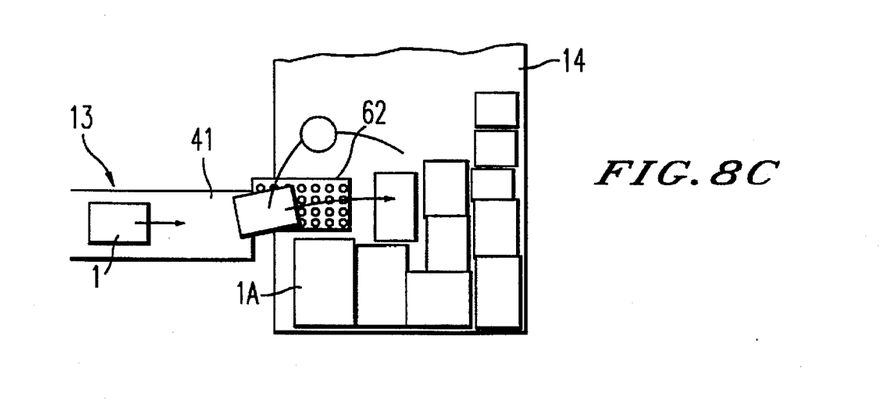
FIG. 8C is a further mode wherein an article is loaded avoiding obstructive articles.

Referring now to the drawings, wherein like reference numerals designate identical or corresponding parts throughout the several views, FIG. 1 shows the entire disposition of one example of a sorting apparatus according to the present invention. FIG. 2 is a schematic diagram showing the positional relationship between an article alignment line and a corresponding loading section. FIG. 3 is a schematic diagram showing a process for loading a loading carrier base onto a motor truck loading space. FIGS. 4A to 4C are schematic diagrams, each showing a major construction of a loading device, wherein FIG. 4A is a plane view, FIG. 4B is a side view, and FIG. 4C is a front view. FIGS. 5A and 5B are schematic diagrams, each showing a construction by which an article storage conveyor is connected to a loading conveyor, wherein FIG. 5A is a plane view and FIG. 5B is a side view. FIGS. 6A to 6C are schematic diagrams, each showing the entire construction of the loading conveyor, wherein FIG. 6A is a side view, FIG. 6B is a view taken and viewed along arrow lines B—B of FIG. 6A, and FIG. 6C is a view taken and viewed along arrow lines C—C of FIG. 6B. FIGS. 7A-7D are schematic diagrams, each showing a distal end of the loading conveyor, wherein FIG. 7A is a plane view, FIG. 7B is a side view, FIG. 7C is a front view, and FIG. 7D is a schematic diagram which explains a disadvantage of an article transfer carrier when a gap plate is not provided for the article transfer carrier. FIG. 8A to 8C are schematic diagrams showing the respective working status for loading articles, wherein FIG. 8A shows a basic mode, FIG. 8B is another mode wherein an article is loaded with its direction changed, and FIG. 8C is a further mode to load an article while avoiding obstructive articles.

As shown in FIG. 1, a loading apparatus 10 of the present invention is made up of a sorting conveyor 11, an article temporary storage conveyor 12 and a loading conveyor 13, and is designed so as to convey and load articles such as fiberboard containers and plastic containers onto a carrier base such as a pallet, container carrier and motor truck loading space. In this embodiment, a carrier base 14 is constructed as a pallet as best shown in FIGS. 2 and 3. The articles which are loaded on the pallet 14 are trans-loaded again onto a delivery container 15 and then delivered to respective delivery destinations such as retail stores through a delivery truck 16 as shown in FIG. 3. With a slip sheet 17 or the like, the articles are trans-loaded from the pallet 14 to the delivery container 15 while maintaining their loaded posture made on the pallet 14. In addition, reference numeral 1 in the drawings designates the article.

(A) Description of the sorting conveyor 11 and the determination of the place to which the article should be sorted (FIGS. 1-3, and Table 1)

The sorting conveyor 11 functions to convey the articles thereon and sort the articles therefrom to the respective storage conveyors 12 accordingly. The place where each article is to be sorted or delivered from the sorting conveyor 11 (hereinafter the place referred to as a sorted place when applicable) is determined such that both an objective one of the plural carrier bases 14, to which the article should be loaded, and an objective one of sections defined on the objective carrier base 14, to which the article should be loaded, are selected.

More specifically, when the articles are loaded on the loading base 14, it is preferable that an article delivered earlier is located nearer the picking-up side (door side) of a container 15 to easily pick-up the article therefrom during delivery by the motor truck 16. For this reason, the determination with respect to the sorting place by the sorting conveyor 11 (kind and amount of sorted article for each conveyor 12) is made in the following manner:

First, loading sections are defined by imaginarily dividing a loading surface of the loading carrier base 14 in a back-and-forth direction from the picking-up side to the inner deepest side of the container 15. In this embodiment, four loading sections 14A to 14D are provided for purposes of explanation as shown in FIGS. 2 and 3. Then, four article storage conveyors 12 are arranged in parallel relation to each other so as to define a pair of four parallel article alignment lines 1 to 4 which occupy an area which substantially corresponds to the back-and-forth length of the carrier base 14 and which respectively confront the loading sections 14A to 14D, as shown in FIG. 2. The articles are sorted from the sorting conveyor 11 to respective article storage conveyors 12 defining the article alignment lines 1 to 4 so that the article can be loaded on the carrier base 14 from the front side to the back side in accordance with the delivery order. The articles sorted on the article storage conveyor 12 defining the article alignment lines 1-4 are loaded through the loading conveyor 13 onto article loading spaces located immediately in front of the respective article alignment lines 1-4.

The sorting process for the articles from the sorting conveyor 11 to each of the article alignment lines 1-4 of the article storage conveyors 12 is performed, for example, as shown in Table 1 below.

TABLE 1

| SHOP DELIVERY ORDER ↓ | KIND | | | SORT PLACE |
|---|---|---|---|---|
| | α 0.03 m³ | β 0.04 m³ | γ 0.02 m³ | |
| A | 5 | 10 | 2 | (1) PICK-UP SIDE |
| B | 2 | — | 8 | (1.11 m³) |
| C | 10 | 5 | 3 | |
| D | 7 | 5 | — | (2) |
| E | 5 | 2 | 7 | (1.04 m³) |
| F | 10 | 2 | 3 | (3) |
| | | | | (1.19 m³) |
| G | 5 | 15 | 2 | (4) |
| H | 7 | 4 | 5 | INNER MOST SIDE |
| I | 4 | 7 | 3 | (0.97 m³) |
| TOTAL | 55 | 50 | 33 | |

The table 1 shows that three kinds of articles (α, β, and γ) are delivered to the shops A to I in this order with the number of each kind of the articles described therein. All the requested articles are divided into four parts for four sections such that volumes of articles for A shop (the number of α articles is 5, the numbers of β articles is 10, - - - ), B shop (the number of α articles, - - - ) and so on are accumulatively calculated so as to obtain a loading volume for each section, which is not greater than the maximum load volume of each of the loading sections 14A to 14D. As a consequence, 17 α articles, 10 β articles and 10 γ articles are sorted in the article alignment line 1 of the storage conveyor 12. The articles are similarly sorted to the other article alignment lines 2 to 4 of the storage conveyors 12. The articles thus sorted are transferred and loaded onto respective sections 14A to 14D of the loading carrier base 14 corresponding to the alignment lines 1 to 4, so that the articles for the earlier delivery shop is located nearer the picking side (the door side) when being transferred to the container 15.

In addition, the above-sorting manner may be performed such that the articles are divided so as to be disposed uniformly on each of the loading sections 14A to 14D of the loading carrier base 14. In this case, the occupied volume of the articles for each section may be made uniform, or otherwise the number of the articles on each section may be uniform.

The articles of the same kind are conveyed from an upstream apparatus to the sorting conveyor 11 consecutively, and sorted to each of the alignment lines 1 to 4 of the storage conveyors 12 with corresponding numbers as mentioned above. That is to say, in the example shown in Table 1, the 55 α articles are consecutively supplied from the upstream apparatus to the sorting conveyor 11, whereby 17 of the α articles are sorted from the conveyor 11 to the alignment line 1, 12 α articles are sorted to the alignment line 2, and so on. The α articles are sorted completely, then the β articles are fed from the upstream conveyor to the sorting conveyor 11 consecutively.

The above-noted sorting processing is instructed to a controller of the sorting conveyor 11 through the calculation by a loading controller (computer). In the embodiment, plural pairs of four article alignment lines are juxtaposed along the sorting conveyor 11 so as to enable the parallel processing to occur wherein articles are simultaneously loaded onto a plurality of loading carrier bases using the pairs.

(B) Article Storage Conveyor 12 (FIGS. 4(A), 4(B), 4(C) and 5(A), 5(B))

The article storage conveyor 12 is disposed on each of the article alignment lines 1 to 4 which branch from the sorting conveyor 11, so as to temporarily store the sorted articles thereon.

The article storage conveyor 12 is of the free-roller type wherein a large number of free-rollers 21 are rotatably supported on a frame base 22 in an inclined manner. The article storage conveyor 12 is provided at its distal or tip end with an article discharge device 23 which functions to separately discharge the articles one by one therefrom to the loading conveyor 13 in accordance with the discharge instruction activation of a discharge instruction cylinder 24 (discharge instruction device) provided on the loading conveyor 13.

The article discharge device 23 is provided with a gate 26 located at a distal end of a swingable base 25 which is swingably supported on the frame base 22 below the free-rollers 21. By swinging the swingable base 25 with the use of a swinging cylinder 27, the gate 26 can be projected upwardly or retracted downwardly relative to the free-roller 21. The swinging cylinder 27 is extended or retracted by means of a fluid switch activation through a mechanical valve 28 which is depressingly driven by the discharge instruction cylinder 24 located on the side of the loading conveyor 13. The swingable base 25 is provided at its upper surface of the relatively distal portion with a leading end braking member 29A which is protruded upwardly above the free-roller 21 when the gate 26 is projected upwardly above the free-roller 21. On the other hand, the swingable base 25 is provided at an upper surface of its relatively rear portion with an intermediate braking member 29B which is protruded upwardly above the free-roller 21 when the gate 26 is retracted below the free-roller 21.

The article discharge device 23 thus constructed functions such that when the mechanical valve 28 is depressed by the discharge instruction cylinder 24 provided on the side of the loading conveyor 13, the swingable cylinder 27 is extended to swing the swinging base 25 to retract the gate 26 and the leading end braking member 29A below the free-roller 21, whereby an article temporarily stored in the distal portion of the article storage conveyor 12 is discharged therefrom. Simultaneously, the intermediate braking member 29B is projected upwardly above the free-roller 21 so as to brake another article temporarily sorted in the intermediate portion of the article storage conveyor 12, whereby two or more articles are prevented from flowing or being discharged therefrom. Thereafter, when the discharge instruction cylinder 24 on the loading conveyor 13 is moved away from the mechanical valve 28, the swinging cylinder 27 is retracted to swing the swinging base 25 in the direction opposite to the direction of the above-mentioned process to retract the intermediate braking member 29B below the free-roller 21 while causing the gate 26 and leading end braking member 29A to be projected upwardly above the free-roller 21, to thereby transfer the article which has been braked on the intermediate portion of the article storage conveyor 12, brake the article by the leading end braking member 29A and stop the article by the gate 26 so as not to be discharged therefrom.

(C) Loading Conveyor 13 (FIGS. 4(A)–4(C) to 7(A)–7(D))

The loading conveyor 13 is adapted to be connected to the discharge or distal end of the article storage conveyor 12 provided on each of the article alignment lines 1 to 4. The loading conveyor 13 functions to convey therein the article which is temporally stored in the article storage conveyor 12 and convey the article toward a position in the vicinity of the loading position defined on the loading carrier base 14.

The loading conveyor 13 includes a running frame 32 disposed on rails 31 elongated along front surfaces of all the pairs of the article alignment lines (FIG. 1), and a running device 33 to enable the running frame 32 to move on the rails 31 along the front surfaces of the article storage conveyors 12 so that the loading conveyor 13 can be positioned at any one of the discharge ends of the article storage conveyors 12. The loading conveyor 13 can be located at any one of the pairs corresponding to the plural loading carrier bases 14. As shown in FIG. 6A, the running device 33 includes a running motor 34 provided on the running frame 32, and a drive wheel 35 which is driven on the rail 31 by the running motor 34. The running motor 34 is controlled by an operation control unit 36A (FIG. 4A) provided on the leading end portion of the loading conveyor 13. With this device, the worker or operator can select one of the article storage conveyors 12 from which the loading operation is to be started while viewing the amount of stored articles thereon, move the loading conveyor 13 along the rail 31, and position the loading conveyor 13 so as to confront with the selected one of the article storage conveyor 12. In this time, the operator instructs, by buttons on the operation control unit 36A, as to which one of frontages of the right and left article storage conveyers 12, the loading conveyor 13 should be moved toward. The loading conveyor 13, by this instruction, is moved one frontage length amount so as to be positioned to confront with the selected article storage conveyor 12. The loading conveyor 13 of invention may be moved, with the activation through a conveyor movement operation switch provided on the running frame 32, so as to be located at any one of a plurality of the loading carriers 14. In this case, the running frame 32 in instructed through the switch so as to be moved rightward or leftward, and continues to be moved during when such instruction continues. When the switch is returned, the running frame 32 is aligned with the most nearest frontage in the moving direction, and stopped at that position. It is possible that the running frame 32 of the loading conveyor 13 is provided with a ride-on space so as to move with the operator mounted on that space when it moves over the plurality of the loading carrier bases 14 as mentioned.

The loading conveyor 13, after being aligned at the confronting position of the article storage conveyor 12 selected as mentioned above, instructs the article storage conveyor 12 to discharge the article therefrom and receives the article thus discharged. Therefore, as shown in FIG. 5, the loading conveyor 13 includes the discharge instruction cylinder 24 and an article pulling-in roller 37, both being located on a portion of the running frame 32 confronting the discharge end of the article storage conveyor 12. The discharge instruction cylinder 24 is capable of depressing the mechanical valve 28 provided on the side of the article storage conveyor 12 as already described. The article pulling-in roller 37 is capable of being driven by a pulling-in motor 38. Reference numeral 39 designates a chain. When the operator instructs the start of the article separate discharge operation using the operation control unit 36A, the discharge instruction cylinder 24 depresses the mechanical valve 28 at a predetermined interval so as to discharge an article from the conveyor 12, and simultaneously the pulling-in roller 37 is rotated in an article pulling-in direction to pull the article toward the conveyor 13. The discharge interval (second) is set through the operation control unit 36A in accordance with the operator's skill and physical fatigue.

In the case where the article can be surely discharged from the article discharge device 23 one by one and pulled stably into the swingable conveyor 13 regardless of inclination thereof, the pulling-in roller 37 can be dispensed with.

The article thus discharged from the article storage conveyor 12 is conveyed by a belt conveyor 41 (defining a conveyance path) of the loading conveyor 13 toward the distal portion thereof. The belt conveyor 41 can be extended and swung, to make it possible to position the distal portion thereof at a location which is immediately in front of and slightly above the loading position defined on the loading carrier base 14 and to convey the article to that location.

In the loading conveyor 13 as shown in FIG. 6A–6C, a swingable frame 43 is swingably supported on the running frame 32 through a swing support shaft 42. A wind-up motor 46 for swing motion is designed to wind-up thereon a chain 45 which is connected to a pulling-up frame 44 connected to an intermediate portion of the swing frame 43 so as to swingably move the swingable frame 43 about the swing support shaft 42. As a consequence, the conveying path angle of the belt conveyor 41 can be changed accordingly.

In the loading conveyor 13 as shown in FIGS. 6A to 6C, a telescopic frame 48 is movably supported on the swing frame 43 in a telescopic manner such that the lower surface of the frame 48 is placed on a frame support roller 49 provided in the swingable frame 43, and a vertical support roller 51 and a side support roller 52, which are provided in right and left side portions of the frame 48, are respectively guided by right and left guide rails 47, 47 of the swingable frame 43. The swingable frame 43 includes a telescopic drive motor 53 and a chain 54 which is driven by the motor 53. A movable member 55 which is fixed to an intermediate portion of the chain 54 is also fixed to the telescopic frame 48 so that the telescopic drive force of the motor 53 is transmitted to the telescopic frame 48, to thereby move the telescopic frame 48 along the guide rails 47, 47 of the swingable frame 43 and extend or retract the telescopic frame 48. As a consequence, the conveyance path length of the belt conveyor 41 can be changed accordingly.

The belt conveyor 41 is suspended on a roller 56 coaxially supported with respect to the swing support shaft 42 in the swingable frame 43, on rollers 57A, 57B, 57C which are axially supported on the swingable frame 43, and on rollers 58A, 58B which are axially supported on the telescopic frame 48. By this arrangement, the length of the belt conveyor 41 can be continuously kept at a predetermined constant amount during when the telescopic frame 48 is extended from or retracted to the swingable frame 43. The conveyor drive motor 59 is fixed to the swingable frame 43 so as to transmit the rotative drive force thereof to the above-mentioned roller 56, to thereby drive the belt conveyor 41 for conveyance.

When the operator instructs the direction of the movement of the belt conveyor 41 through a joy-stick (operation lever) provided on the operation control unit 36B, the swing-motion wind-up motor 46 and telescopic drive motor 53 are activated so as to swing and extend (or retract) the belt conveyor 41. In addition, during the time period when the direction of movement of the belt conveyor 41 is instructed, the conveyor drive motor 59 is successively activated so as to drive the belt conveyor 41 for conveyance.

In the loading conveyor 13, as shown in FIGS. 7(A)–7(D), an article transfer carrier 62 is tiltably and slidably supported on a support shaft 61 provided on a front end support member 60 of the front end of the telescopic frame 48. The article transfer carrier 62 is provided at its upper surface with an article sliding surface made up of a large number of ball casters 63. Owing to this arrangement, the article conveyed from the belt conveyor 41 is slid on the article sliding surface toward the loading position without suppressing the conveyance inertia force applied thereto. Further, by applying a little rotative operation force to the article on the way to the loading position, the article can be easily oriented on the article sliding surface to a suitable direction for loading.

The article transfer carrier 62 is maintained by the posture control device 65 so as to present a substantially constant posture with respect to a horizontal plane. That is, the carrier 62 is kept horizontally or slightly downwardly oriented (at an angle enhancing the flow or conveyance of the article, for example 0°–2°). The posture control device 65 includes an angular drive cylinder 66 fixed on the telescopic frame 48, and an angle detector 67 provided on the article transfer carrier 62. When the leading end is inclined in conjunction with the swing motion of the loading conveyor 13, the angle detector detects the direction of incline of the article transfer carrier 62 (downward or upward), and the angular cylinder 66 angularly drives the article transfer carrier 62 in a direction opposite to the detected incline direction. The angle detector 67 detects the incline direction by detecting which one of front or rear limit switches 67A and 67B is turned ON by a weight 69 supported on a pin 68 due to the inclination. The angular cylinder 66 suitably depresses the abutment surface 62A of the article transfer carrier 62 to angularly swing the article transfer carrier 62 about the support shaft 61 accordingly, to thereby adjust the incline of the article transfer carrier 62.

A power cylinder, the telescopic amount of which is controllable, can be used as the angular cylinder 66. The angle detector 67 may be replaced with an available angle sensor used generally.

The article transfer carrier 62 is slidable in an axial direction of the support shaft 61 (i.e. in a direction perpendicular to the conveyance direction of the loading conveyor 13), so that the operator can guide the article to the loading position while avoiding the obstructive article 1A which has already been loaded in place (see FIG. 8C).

Additionally, the aforementioned operation control unit 36B is installed on each of the right and left side portions of the lower surface of the article transfer carrier 62.

Further, in order to prevent the article from being caught by the front surface of the nearest ball caster 62 of the article transfer carrier 62 when the belt conveyor 41 is inclined downwardly, the ball caster 63 is lowered from the belt conveyor 41 by a constant height (3–5 mm) under the state that the article transfer carrier 62 is held horizontally.

Furthermore, to prevent the article from being caught between the front and rear adjacent ball casters when the belt conveyor 41 is inclined downwardly as shown in FIG. 7D, the article transfer carrier 62 is provided with a gap plate 79 provided between the front and rear ball casters 63.

The article conveyed to the article transfer carrier 62 of the leading end of the loading conveyor 13, is loaded by the operator on the loading position defined on the loading carrier base 14 in the following processes (1) to (3):

(1) The operator guides the article toward the loading position, utilizing conveyance inertia force applied thereto by the belt conveyor 41 as shown in FIG. 8A. Putting his hand lightly on the rear of the article to cause the article to jump on the loading position makes it easier to perform the loading operation. Simultaneously, putting his other hand on the front of the article to regulate and stop the article at the desired position can speed-up the operation.

(2) The operator can orient the article to a suitable direction for the loading operation on the sliding surface 64 by slightly applying a rotative force thereto on the way to the loading position as shown in FIG. 8B.

(3) Sliding the article transfer carrier 62 along the support shaft 61 makes it possible to load the article while avoiding obstructive articles 1A which has been already loaded as shown in FIG. 8C.

The following is a description relating to loading process utilizing the loading apparatus 10 thus constructed:

(1) Articles conveyed by the sorting conveyor 11 are suitably sorted to the article storage conveyors 12 of the article alignment lines 1 to 4 corresponding to loading sections 14A to 14D defined on the loading carrier base 14. The determination of sort destinations by the sorting conveyor 11 is made so that the article will be loaded on the base 14 in the delivery order in the front-to-rear direction as exemplified by the aforementioned Table 1.

(2) The operator, while viewing the degree of the stored articles on the article storage conveyors 12, selects an initial article storage conveyor 12 from which the article loading operation is started. The loading conveyor 13 is moved on the rail 31 as already described, so as to be aligned to a rearward portion of the selected article storage conveyor 12.

(3) The operator instructs the discharge of the articles to the article discharge device 23 of the article storage conveyor 12 through the discharge instruction cylinder 24 of the loading conveyor 13 as already described, and the articles discharged from the article storage conveyor at the predetermined discharge interval is conveyed-in to the loading conveyor 13.

(4) The loading conveyor 13 is swung and extended (or retracted) to locate the distal article transfer carrier 62 near the loading position of the base 14. The article sliding surface 64 of the transfer carrier 62 is kept at the substantially constant posture with respect to a horizontal plane by the posture control device 65 regardless of the swing angle of the loading conveyor 13.

(5) The article conveyed by the belt conveyor 41 of the loading conveyor 13 is slid on the article sliding surface 64 of the transfer carrier 62 and loaded on the loading position defined on the base 14 utilizing the inertia of the conveyance force applied to the article by the loading conveyor 13 as in the manner described with reference to FIGS. 8A to 8C.

The effects produced by the present embodiment of the invention will be described hereunder.

(1) By swinging and extending the belt conveyor 41 of the loading conveyor 13, the distal end of the article transfer carrier 62 can be positioned in the vicinity of the article loading position. Further, the article sliding surface 64 of the article transfer carrier 62 can be maintained with a substantially constant posture with respect to the horizontal, that is, can be maintained horizontally or at a slightly downward incline (the incline angle: 0°–2°) with respect to the horizontal, regardless of the swing angle (incline angle) of the loading conveyor 13. Therefore, the article discharged from the loading conveyor 13 can be transferred to the loading position easily in such a manner that the article is slid on the sliding surface 64 of the transfer carrier 62 while being directed by the operator's hand help without suppressing the influence of the inertia force applied by the conveyor 13. During the process of the transfer, the operator can also easily rotate the article horizontally on the sliding surface 64 of the article transfer carrier 62 so as to orient the posture of the article suitably for loading. That is to say, it is possible to reduce the physical labor of the operator.

(2) It is possible to provide, upstream of the loading conveyor 13, the article storage conveyor 12 which temporarily stores articles thereon. Consequently, the operator can view all of the articles to be loaded before the start of the loading process, so that the operator can start his loading work after the determination is preliminary made as to how the loading process is to be performed (the articles should be loaded horizontally or vertically, or the like) in order to form an entire or resultant shape which can hardly be collapsed on the loading carrier 14 when the loading operation is completed. That is to say, the working efficiency can be improved remarkably.

(3) A plurality of article storage conveyors 12 can be provided at the upstream of the loading conveyor 13, and the loading conveyor 13 can be positioned at any one of the discharge ends of the article storage conveyors 12. Therefore, the loading conveyor 13 can be selectively located in the vicinity of any one of a plurality of loading sections 14A–14D defined imaginarily by dividing the loading surface of the loading base or carrier 14 in the width direction thereof. Further, the article discharged from the article storage conveyor 12 can be transferred to the loading section to which the loading conveyor 13 is adjacently located. Thus, the length which the operator must transfer the article by himself can be made extremely small to thereby reduce physical labor and to improve working efficiency.

(4) The article discharge timing from the article storage conveyor 12 can be controlled by the instruction of the article discharge instruction cylinder 24 provided in the loading conveyor 13. Therefore, the timing can be selected suitable for the operator's skill, physical fatigue and physical strength, to thereby reduce physical labor and improve working efficiency.

(5) The article transfer carrier 62 can be slidingly moved in a direction perpendicular to a conveying direction of the loading conveyor 13. Therefore, the operator, when performing the article transfer process from the article transfer carrier 62 to the article loading position, can avoid other articles which have been already loaded and transferred to the loaded position, to thereby reduce physical labor and improve working efficiency.

According to the present invention, it is possible to reduce the required labor of loading articles onto a loading base such as pallet and to enhance efficiency thereof.

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An article loading apparatus defining a conveying path by which an article is capable of being conveyed toward a side where the article is to be loaded, said apparatus comprising:

an extendable and swingable loading conveyor extending and swinging said conveying path, said loading conveyor having a conveyor belt and a movable frame supporting said conveyor belt;

an article transfer carrier mounted at an end portion of said movable frame and having an article sliding surface, said article transfer carrier being connected to a distal end of said loading conveyor;

a mechanism telescoping said movable frame and said conveyor belt in a direction towards and away from said article transfer carrier; and a posture control device keeping said article sliding surface of said article transfer carrier at a substantially constant posture with respect to a horizontal plane and including an angular drive cylinder connected to one of said movable frame and said article transfer carrier and an angle detector provided on one of the article transfer carrier and said movable frame wherein said article sliding surface comprises a plurality of ball casters, said ball caster permitting sliding of the article from the conveyor belt without suppressing a conveyance inertia applied to the article by the conveyor belt and wherein the ball casters permit rotation of the article on the ball casters.

2. The article loading apparatus according to claim 1, further comprising:

at least one article storage conveyor temporarily storing articles therein, wherein said loading conveyor is connected to a discharge end of said at least one article storage conveyor so that said article temporarily stored in said article storage conveyor is conveyed therefrom into said loading conveyor.

3. The article loading apparatus according to claim 2, wherein a plurality of said article storage conveyors are disposed in parallel relation to each other, and said loading conveyor includes a running device enabling said loading conveyor to be moved along said discharge end of said article storage conveyor and to be positioned at any one of said discharge ends.

4. The article loading apparatus according to claim 2, wherein said loading conveyor includes a discharge instruction device instructing discharge of said article from said article storage conveyor, and said article storage conveyor includes an article discharge device discharging an article in accordance with the instruction of the discharge instruction device.

5. The article loading apparatus according to claim 1, wherein said article transfer carrier includes a slide device moving said article transfer carrier in a direction perpendicular to a conveying direction of said loading conveyor.

6. The article loading apparatus according to claim 1, wherein a mechanism is positioned above the loading conveyor, said mechanism lifting and lowering the loading conveyor.

7. The article loading apparatus as claimed in claim 6, wherein the loading conveyor includes a roller guided by guide rails.

8. An article loading apparatus defining a conveying path by which an article is capable of being conveyed toward a side where the article is to be loaded, said apparatus comprising:

an extendable and swingable loading conveyor extending and swinging said conveying path;

an article transfer carrier having an article sliding surface, said article transfer carrier being connected to a distal end of said loading conveyor; and a posture control device keeping said article sliding surface of said article transfer carrier at a substantially constant posture with respect to a horizontal plane wherein said article transfer carrier includes a slide device moving said article transfer carrier in a direction perpendicular to a conveying direction of said loading conveyor and a mechanism pivotally moving the article transfer carrier about an axis which is substantially perpendicular to said conveying direction and adjusting an angle of inclination thereof.

9. The article loading apparatus according to claim 8, further comprising:

at least one article storage conveyor temporarily storing articles therein, wherein said loading conveyor is connected to a discharge end of said at least one article storage conveyor so that said article temporarily stored in said article storage conveyor is conveyed therefrom into said loading conveyor.

10. The article loading apparatus according to claim 9, wherein a plurality of said article storage conveyors are disposed in parallel relation to each other, and said loading conveyor includes a running device enabling said loading conveyor to be moved along said discharge end of said article storage conveyor and to be positioned at any one of said discharge ends.

11. The article loading apparatus according to claim 9, wherein said loading conveyor includes a discharge instruction device instructing discharge of said article from said article storage conveyor, and said article storage conveyor includes an article discharge device discharging an article in accordance with the instruction of the discharge instruction device.

12. The article loading apparatus according to claim 8, wherein said loading conveyor includes a movable frame which has at least one guide rail, the loading conveyor is guided by said at least one guide rail and wherein a mechanism is positioned above the loading conveyor, said mechanism lifting and lowering the loading conveyor.

13. The article loading apparatus as claimed in claim 12, wherein the loading conveyor includes a roller guided by said guide rails.

14. The article loading apparatus according to claim 1, wherein said article sliding surface is transversely slidable with respect to said movable frame.

* * * * *